(No Model.)

W. H. MUGGERIDGE.
HEMP CLEANING MACHINE.

No. 464,800. Patented Dec. 8, 1891.

Witnesses
C. W. Miles
T. Simmons

Inventor
William H. Muggeridge
By his Attorneys Wood & Boyd

United States Patent Office.

WILLIAM H. MUGGERIDGE, OF BELLEVUE, KENTUCKY, ASSIGNOR TO JOSIAH O. WARD, OF ORANGE, AND WILBUR HUNTINGTON, OF MONTCLAIR, NEW JERSEY.

HEMP-CLEANING MACHINE.

SPECIFICATION forming part of Letters Patent No. 464,800, dated December 8, 1891.

Application filed August 27, 1891. Serial No. 403,901. (No model.)

*To all whom it may concern:*

Be it known that I, WILLIAM H. MUGGERIDGE, a citizen of the United States, and a resident of Bellevue, in the county of Campbell and State of Kentucky, have invented certain new and useful Improvements in Hemp-Cleaning Machines, of which the following is a specification.

The object of my invention is to provide means for thoroughly cleaning the hurds out of broken hemp fiber and straightening the same without forming tow.

The various features of my invention will be fully set forth in the description of the accompanying drawings, making a part of this specification, in which—

Figure 1:
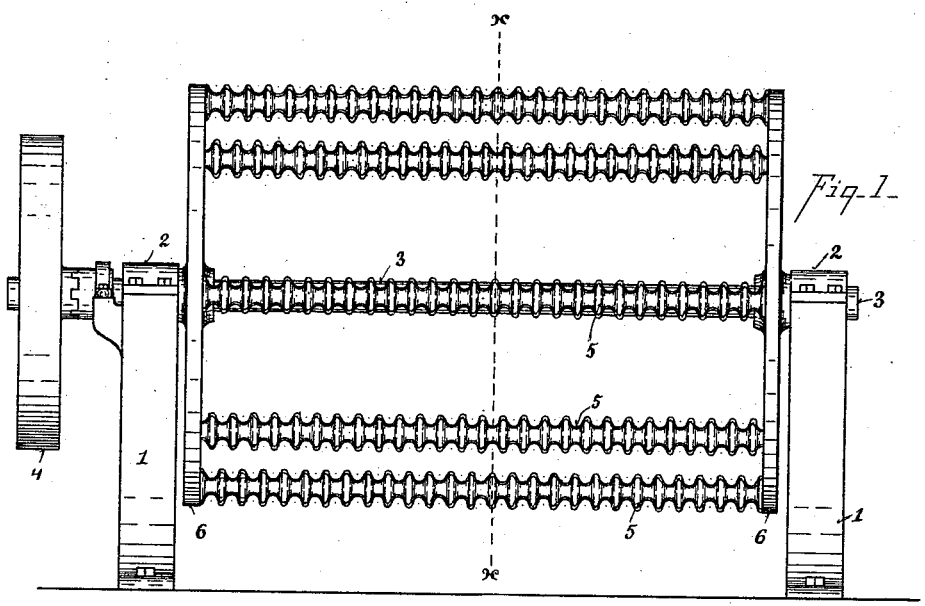
Figure 2:
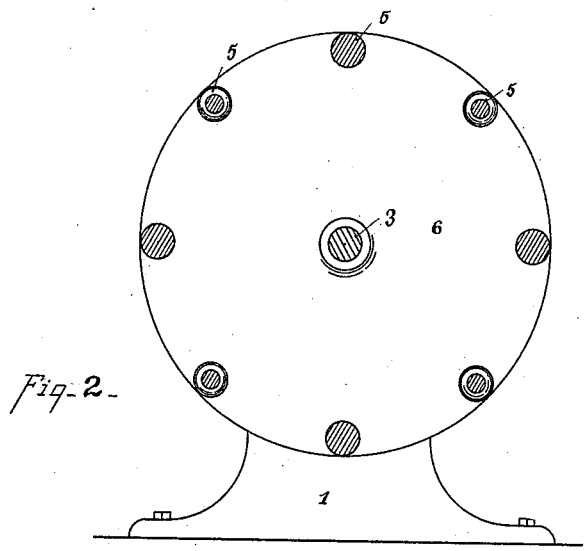

Figure 1 is a front elevation of my improvement. Fig. 2 is a cross-section on line $x\,x$, Fig. 1.

1 represents the frame of the machine.

2 represents journal-boxes, in which is mounted the main shaft 3. 4 represents a driving-pulley clutched to the same.

6 represents heads united to the main shaft 3.

5 represents a series of bars extending from head to head and either rigidly or loosely secured thereto. These bars are provided with a series of annular disk-like projections, which are preferably formed integral with the bar, and are so arranged that the annular projections of one bar alternate with the annular projections of another bar in such manner that the disks or annular projections operate successively upon the same fiber.

This machine is operated as follows: It is driven by any ordinary power at medium rate of speed. The operator seizes a hank of broken hemp and retaining hold of the end thereof throws it over the outer periphery of the cleaning-bars, which, as they revolve, force the disk-like projections up through the hemp and travel through the hemp, straightening the fiber, and as the hemp is split or opened by the cleaning-disk the hurds fall out. The staggering feature of the bar allows each succeeding bar to take the hemp fiber at a different point. The operator, when he has cleaned one end of the hank, straightens it out, seizes the opposite end, and cleans it in a similar manner. The operator may apply more or less friction to the bunch of hemp as he holds it more or less firmly to the action of the cleaning-bars. The fiber is readily straightened without cutting it on account of the peculiar shape of the cleaning-disks, the hurds thereby avoiding the making of tow, which is incident to the use of sharp instruments, such as teeth, which have hitherto been employed for this purpose.

I am aware that it has been proposed to clean hemp by the employment of reels comprising toothed bars, as in Letters Patent No. 4,034, dated May 7, 1845, to W. Y. Singleton; but my invention differs therefrom in that I employ heads attached to a shaft and cleaning-bars secured to the heads and each having a gang of annular radial projections, and since these projections are circular they present no sharp or cutting edges, so that I entirely avoid making tow by unduly straining the fibers to break or cut them.

Having described my invention, what I claim is—

1. A hemp-cleaning device consisting of heads attached to a shaft and cleaner-bars connected to the heads, each cleaner-bar having a gang of annular radial projections of disk-like form and an intervening space between each pair of such projections, substantially as described.

2. A hemp-cleaning device consisting of a rotary shaft, heads attached to the shaft, and cleaner-bars connecting the heads and each having a gang of annular projections, those of one bar alternating with those of another bar, substantially as and for the purpose described.

In testimony whereof I have hereunto set my hand.

WILLIAM H. MUGGERIDGE.

Witnesses:
P. SIMMONS,
C. W. MILES.